March 17, 1953  R. D. PARKER  2,631,350
STRAP CLAMP
Filed July 30, 1948
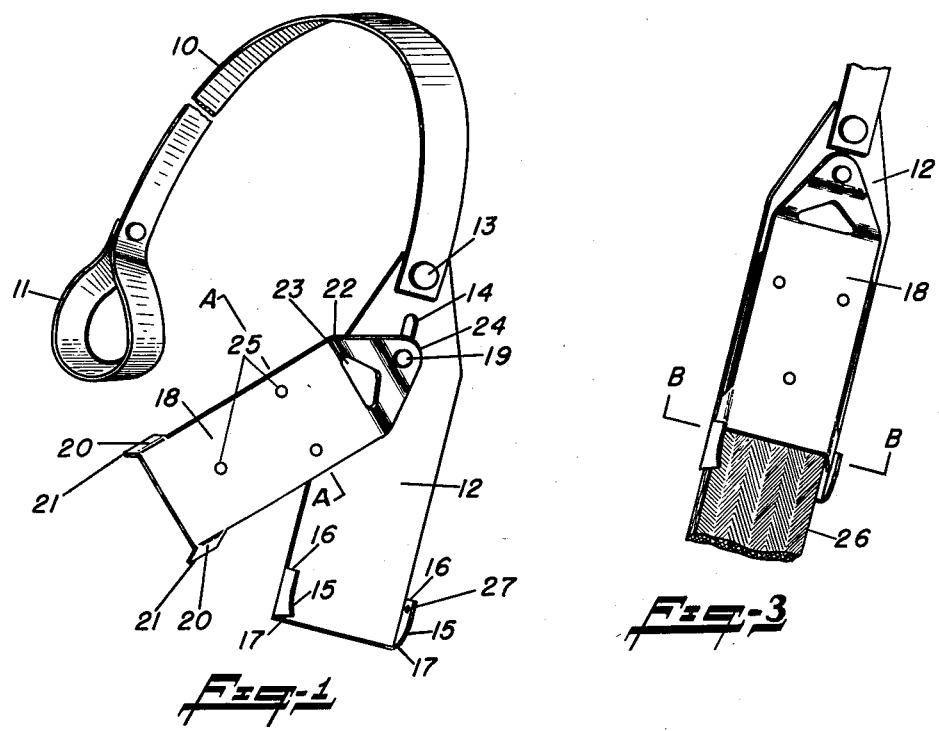
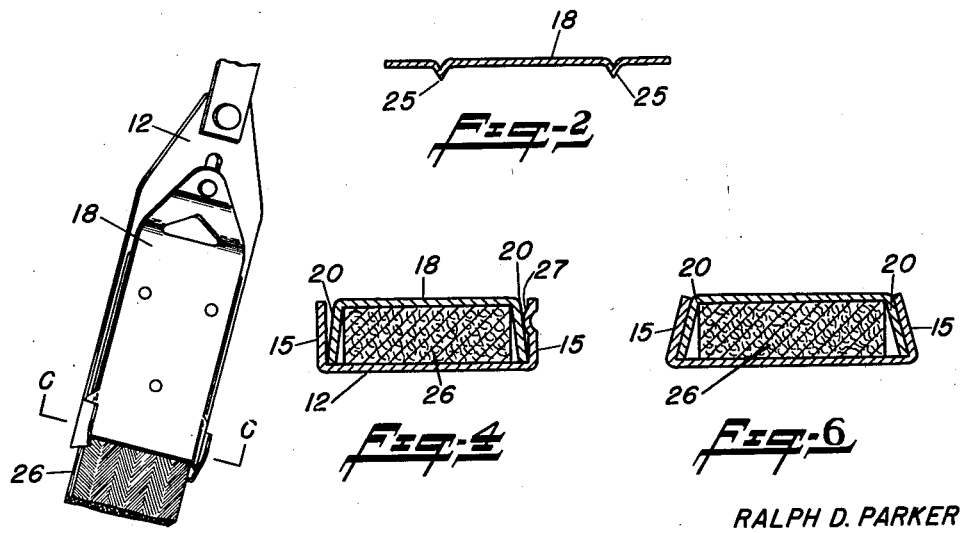
RALPH D. PARKER
INVENTOR.
BY Rudolph J. Jurick
ATTORNEY Patented Mar. 17, 1953

2,631,350

UNITED STATES PATENT OFFICE 2,631,350

STRAP CLAMP

Ralph D. Parker, Orange, N. J.

Application July 30, 1948, Serial No. 41,551

3 Claims. (Cl. 24—263)

This invention relates to a device for use in applying emergency skid chains to automobile tires and more particularly to a novel improvement in a tire chain tool adapted for guiding the fabric strap of an anti-skid chain unit around the tire.

The wheel of the modern automobile is provided with a series of arcuate slots through which the fabric strap of an emergency or antiskid chain may be threaded. Such chains comprise a series of transverse chains, a fabric fastening-strap and a buckle so arranged that the chains lie crosswise across the face of the tire when the strap is wrapped around the tire and fastened by the buckle. However, the slots in the wheel are narrow and usually lie on a radius somewhat less than the radius of the brake drum. Further, the automobile fenders completely cover the top and sides of the tire. Consequently it is difficult for a person to reach behind the tire to thread the strap of the antiskid chain through the slots in the wheel.

Various devices have been proposed to facilitate the installation of the chains. The simplest type comprises a length of spring wire having an offset end adapted to fit into a hole at the end of the fabric strap whereby the strap may be pulled through the wheel slot. This type of device has a limited useful life as the hole in the strap is soon torn through the edge and/or the leading edge of the strap becomes frayed so that its cross-sectional area becomes larger than the slot opening.

Later devices have been proposed in which a set of clamping jaws engage the leading edge of the fabric strap. These are generally of rather complicated design and costly to produce.

An object of this invention is the provision of a tire chain tool of comparatively simple construction and inexpensive to manufacture yet which is compact, durable and highly reliable in use.

An object of this invention is the provision of a tire chain tool embodying novel clamping means for engaging the strap of an anti-skid chain whereby said strap may be threaded through a slot conveniently and positively.

An object of this invention is the provision of a tire chain applying tool comprising a coiled strap, a plate having upright tabs angularly offset with respect to each other, a clamping member having downturned tabs angularly offset with respect to each other, said clamping member being slidably attached to the plate whereby the tabs cooperate to form a clamp for engaging the fabric strap of a tire chain.

An object of this invention is the provision of tire chain applying tool comprising a coiled strap, a plate secured to one end of the coiled strap said plate having a plurality of upwardly extending tabs, a clamping member having a plurality of downwardly extending tabs and downwardly extending prongs, and means loosely securing the clamping member to the plate whereby the member and plate may be adjusted to clamp firmly a fabric strap placed therebetween.

These and other objects and advantages will become more apparent from the following description when taken with the accompanying drawings illustrating one embodiment of the invention. It will be understood that the form of the invention herewith shown and described is to be taken as illustrative of same and is not intended to limit the scope of the invention beyond the terms of the claims appended hereto.

In the drawings wherein like reference numerals identify like parts in the several views:

Figure 1 is an isometric view of a device made in accordance with this invention and showing the cooperating clamping members in open position;

Figure 2 is a cross-sectional view taken along the line A—A of Figure 1 and shows the detents or prongs depending from the upper clamping member;

Figure 3 is similar to Figure 1 and shows the cooperating clamping members in the initial clamping position around the end of a fabric strap;

Figure 4 is a cross-sectional view taken along the line B—B of Figure 3 and showing the overlapping arrangement of the tabs carried by the clamping members;

Figure 5 is similar to Figure 3 and shows the cooperating clamping members in the final clamping position around a fabric strap; and Figure 6 is a cross-sectional view taken along the line C—C of Figure 5.

Referring now to Figure 1 the device comprises a flat resilient coiled band 10 made of metal or other suitable material said band terminating at one end in a substantially closed loop 11 which facilitates use of the device as will be described hereinbelow. A substantially flat, rectangular plate 12 is attached to the other end of the band 10 as by the rivet 13. The plate 12 is provided with a longitudinal slot 14 and upwardly directed tabs 15. It is pointed out the tabs 15 are angularly disposed with respect to each other. More specifically, the inner edge 16 of each tab lies in a plane substantially normal to that of the plate 12 whereas the outer edge 17 of each tab is inclined inward. It will also be noted that the plate 12 is tapered somewhat toward the outer edge such that the base distance taken laterally across the plate 12 between the inner edges 16 of the tabs is greater than that between the outer edges 17. Consequently, the upwardly-extending walls of the two tabs gradually incline toward each other and toward the base of the plate 12. There is thus formed, across the free edge of the plate 12, a restrictive opening. By way of further explanation, if a block of wood, having a width equal to that of the plate 12 and a thickness somewhat less than the height of the tabs 15, is moved longitudinally along the plate 12, such block would clear the inner edges of the tabs but would become wedged between the tabs and the plate at a point short of the free edge of the plate. It is this wedging, or clamping, action, brought about by shape of the two tabs, that serves as a means for securing my tool to the end of a fabric strap such as is used on conventional emergency skid chains.

A second plate 18 is pivotally and slidably attached to the plate 12 by means of a double-headed stud 19 passing through the longitudinal slot 14, as shown. The plate 18 is provided with a pair of downwardly-extending, diverging tabs 20 at the outer end, said tabs lying in planes which intercept the plane of the plate at an obtuse angle. It is pointed out the walls of each of the tabs 20 are mono-planar as distinguished from the somewhat arcuate walls of the tabs 15 of the plate 12. The rear portion 22 of the plate 18 is inclined toward the plate 12 and an oblong aperture 23 is provided at the region where the plate slopes downward. Such aperture serves to accommodate the thumb of the user when the device is being clamped to the fabric of the skid chain, as will be described hereinbelow in connection with actual use of my device. It may here be pointed out that the axial length of the plate 18 from the rivet 19 to the free edge is somewhat less than the axial length of the plate 12 from its free edge to the furthermost end of the aperture 14. Thus, when the plate 18 is moved to its furthermost position (toward the rivet 13) this plate can be rotated into longitudinal alinement with the cooperating plate 12 as in such relative positions of the two plates the outer edges of the tabs 20 will clear the inner edges of the tabs 15. The end section 24 of the plate is curved upward slightly to facilitate such rotative alinement and separation of the two plates as shown in Figure 1. Depending downward from the surface of plate 18 are a series of detents or prongs 25 which may be formed by a partial punching operation as is well known in the metal fabricating art.

In use the two plates 12 and 18 cooperate to form clamping members which clamp the fabric strap of the type provided on conventional emergency, anti-skid chains. A portion of a fabric strap 26 is shown in Figure 3. The end of the strap is placed between the tabs 15 of the plate 12. The upper plate 18 is then rotated into alinement with the lower plate 12 after which the plate 18 is pressed against the strap causing the prongs 25 to enter into the fabric strap 26. At the same time the tabs 20 of the upper plate 18 pass down along the edges of the strap 26 but within the tabs 15 of the lower plate 12. Figure 4 illustrates the relative position of the tabs 15 and 20 around the fabric strap 26, which may be termed the initial clamping position.

It will be noted that one of the tabs 15 of the lower plate 12 has a detent 27 extending inward. The purpose of the detent is to hold the two plates 12 and 18 together when there is no fabric strap therebetween. In order for the tabs 20 to seat against the lower plate 12 as shown in Figure 4 the leading edge of the right tab 20 must be forced past the detent 27 in the cooperating tab 15 by applying finger pressure between the plates and sliding the plate 18 forward relative to the plate 12. With the two plates 12 and 18 held together in this fashion the entire head of my tire chain tool may be inserted through the slot or opening in the wheel of an automobile. The band 10 is then pushed through the slot to the extent necessary for the head or clamping end of the device to extend beyond the tire where it can be reached easily. The user then opens the clamping members by forcing the upper plate 18 toward the rear of the plate 12 and rotating same to the relative position as shown in Figure 1. The fabric strap 26 of the tire chain is then placed between the tabs 15 of the lower plate 12 and the upper plate 18 swung into position and pressed downward as explained above with respect to Figure 3.

The fabric strap 26 is clamped in the final position by grasping the strap 26 in the left hand and grasping the clamping members in the right hand. By pulling on the strap 26, while at the same time pressing the upper plate 18 in the same direction by applying the thumb of the right hand against the inclined surface 22, the tabs 20 of the upper plate 18 slide along the tabs 20 of the lower plate 12 until the tabs line up as shown in Figure 5. It will be apparent the aperture 23 in the inclined portion of the plate 18 serves to accommodate the thumb as pressure is exerted to slide the plate forwardly into alignment with the lower plate 12. Inasmuch as the tabs 15 are inclined toward each other the tabs 20 are forced inward toward the side surfaces of the fabric strap 26 and become locked in position so that the two cooperating plates 12 and 18 cannot spring apart. The fabric strap 26 can now be drawn through the slot in the wheel positively and easily after which the device is disengaged from the strap by reversing the procedure outlined above.

Having now described my invention in detail certain variations in the relative shape and arrangement of the parts will be apparent to those skilled in the art.

I claim:

1. In a tool of the type including a resilient band and a strap-clamping arrangement to facilitate threading of the fabric strap of an emergency skid chain through an aperture in a wheel; an improved strap-clamping arrangement comprising a pair of superposable, engageable, substantially-rectangular plates consisting of a bottom plate having an upper end secured to the band, a longitudinal slot near the upper end and a pair of oppositely-disposed and inwardly-directed tabs extending forwardly from opposite side edges at the lower end; a top plate having an aperture near the upper end, a pair of oppositely-disposed and outwardly-directed tabs extending rearwardly from opposite side edges at the lower end, said tabs being adapted to receive the fabric strap between them, and at least one rearwardly directed prong projecting from the top plate and adapted to penetrate the fabric strap; and a rivet passing through the aperture in the top plate and the slot in the bottom plate said rivet loosely securing both plates together to allow angular and longitudinal movement of one plate relative to the other, the recited arrangement being such that when the top plate is alined with and moved downwardly with respect to the bottom plate the tabs of the bottom plate at least partially overlap the tabs of the top plate thereby preventing lateral separation of the plates.

2. The invention as recited in claim 1, wherein the lower end of the bottom plate is tapered and the said tabs extend from the edges of such tapered end.

3. The invention as recited in claim 2, wherein the upper end of the top plate includes an inclined surface portion directed toward the bottom plate and terminating in an offset portion, and the said aperture is located in such offset portion of the plate; and including a finger-engageable aperture in said inclined surface portion.

RALPH D. PARKER.

REFERENCES CITED

The following references are of record in the file of this patent:

UNITED STATES PATENTS

| Number | Name | Date |
| --- | --- | --- |
| 508,883 | Huff | Nov. 14, 1893 |
| 1,283,876 | Oliver | Nov. 5, 1918 |
| 2,055,328 | Augenstein | Sept. 22, 1936 |
| 2,143,702 | Kestenman | Jan. 10, 1939 |
| 2,219,392 | Jorgensen | Oct. 29, 1940 |
| 2,234,902 | Keppel | Mar. 11, 1941 |
| 2,328,680 | Royer | Sept. 7, 1943 |
| 2,438,547 | Doebert | Mar. 30, 1948 |

FOREIGN PATENTS

| Number | Country | Date |
| --- | --- | --- |
| 204,942 | Switzerland | May 31, 1939 |
| 572,929 | France | June 16, 1924 |